United States Patent
Conley et al.

(10) Patent No.: US 6,651,107 B1
(45) Date of Patent: Nov. 18, 2003

(54) REDUCED HARDWARE NETWORK ADAPTER AND COMMUNICATION

(75) Inventors: Michael R. Conley, Thousand Oaks, CA (US); Eric Henderson, Salt Lake City, UT (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/401,005

(22) Filed: Sep. 21, 1999

(51) Int. Cl.⁷ .............................................. G06F 15/16
(52) U.S. Cl. ....................... 709/250; 709/201; 370/419; 370/428; 370/463; 703/24
(58) Field of Search ................................ 709/250, 201; 370/428, 401, 419, 463; 703/24; 707/1

(56) References Cited

U.S. PATENT DOCUMENTS

| | | | |
|---|---|---|---|
| 4,672,570 A | | 6/1987 | Benken ........................ 709/250 |
| 5,299,314 A | | 3/1994 | Gates ........................... 395/200 |
| 5,321,819 A | | 6/1994 | Szczepanek ................. 709/228 |
| 5,485,584 A | * | 1/1996 | Hausman et al. .............. 703/24 |
| 5,671,355 A | | 9/1997 | Collins ......................... 709/250 |
| 5,764,896 A | | 6/1998 | Johnson ....................... 709/250 |
| 5,784,573 A | | 7/1998 | Szczepanek et al. ......... 709/250 |
| 5,802,285 A | | 9/1998 | Hirviniemi .................... 709/250 |
| 5,845,152 A | | 12/1998 | Anderson et al. .............. 710/52 |
| 5,872,920 A | | 2/1999 | Hausman et al. ........... 709/250 |
| 6,047,001 A | * | 4/2000 | Kuo et al. .................... 370/392 |
| 6,061,767 A | * | 5/2000 | Kuo et al. .................... 370/452 |
| 6,065,073 A | * | 5/2000 | Booth .......................... 370/908 |
| 6,154,796 A | * | 11/2000 | Kuo et al. .................... 370/428 |
| 6,275,501 B1 | * | 8/2001 | Lucas et al. ................. 370/463 |
| 6,345,310 B1 | * | 2/2002 | Allison et al. ............... 709/250 |
| 6,373,848 B1 | * | 4/2002 | Allison et al. ............... 370/401 |
| 6,385,208 B1 | * | 5/2002 | Findlater et al. ............. 370/419 |
| 6,393,457 B1 | * | 5/2002 | Allison et al. ............... 709/201 |
| 2002/0077995 A1 | * | 6/2002 | Allison et al. .................. 707/1 |

* cited by examiner

*Primary Examiner*—Mark R. Powell
*Assistant Examiner*—Hai V. Nguyen
(74) *Attorney, Agent, or Firm*—Blakely, Sokoloff, Taylor & Zafman LLP

(57) ABSTRACT

The present invention provides a network interface adapter for connecting a client computer to a computer network that includes a reduced hardware media access controller (MAC) coupled through a physical interface (PHY) to the network physical link. A significant portion of the MAC functionality is implemented as software within the processor of the host client computer. The hardware portion of the preferred MAC implementation provides memory for buffering communications between the PHY and the client computer. The preferred hardware aspects of a MAC in accordance with the present invention also includes a register interface for register-driven communications between the hardware portion of the MAC and the software portions of the MAC implemented within the client computer. By implementing most of the MAC functionality in software within the host computer, the preferred MAC provides lower cost, lower power consumption, and generally greater flexibility.

40 Claims, 7 Drawing Sheets

| ADDRESS | ABBREVIATION | NAME |
|---|---|---|
| 0, 1, 2, 3 | ED | DATA REGISTER |
| 4, 5 | BC | BYTE COUNT REGISTER |
| 6 | CS | COMMAND/STATUS REGISTER |
| 7 | MII | MII REGISTER |

| DATA REGISTER | | | | | | | | ADDRESS: 0, 1, 2, 3 |
|---|---|---|---|---|---|---|---|---|
| BIT | 7 | 6 | 5 | 4 | 3 | 2 | 1 | 0 |
| DEFINITION | D7 | D6 | D5 | D4 | D3 | D2 | D1 | D0 |

| FIELD | TYPE | DESCRIPTION |
|---|---|---|
| D[31:0] | R/W | THE DATA REGISTER IS THE INTERFACE TO THE RECEIVE AND TRANSMIT DATA BUFFER. READING FROM THIS REGISTER WILL RETRIEVE THE NEXT BYTES IN THE RECEIVE FIFO AND WRITING TO THIS REGISTER WILL PLACE THE DATA INTO THE TRANSMIT FIFO. ACCESSES CAN BE BYTE, WORD OR DWORD, BUT ACCESSES BEGIN AT ADDRESS 0. |

*FIG. 8*

| BYTE COUNT REGISTER | | | | | | | | ADDRESS: 4, 5 |
|---|---|---|---|---|---|---|---|---|
| BIT | 7 | 6 | 5 | 4 | 3 | 2 | 1 | 0 |
| DEFINITION | D7 | D6 | D5 | D4 | D3 | D2 | D1 | D0 |
| BIT | 15 | 14 | 13 | 12 | 11 | 10 | 9 | 8 |
| DEFINITION | D15 | D14 | D13 | D12 | D11 | D10 | D9 | D8 |

| FIELD | TYPE | DESCRIPTION |
|---|---|---|
| D[15:0] | R/O | THIS IS A 16-BIT VALUE THAT REFLECTS HOW MUCH DATA IS CURRENTLY AVAILABLE IN THE RECEIVE FIFO. WHEN THIS REGISTER READS ZERO, THERE IS NO MORE DATA AVAILABLE. |

*FIG. 9*

| COMMAND/STATUS REGISTER | | | | | | | | ADDRESS: 6 (WRITE) |
|---|---|---|---|---|---|---|---|---|
| BIT | 7 | 6 | 5 | 4 | 3 | 2 | 1 | 0 |
| DEFINITION | RST | | | | | | | IE |

| FIELD | TYPE | DESCRIPTION |
|---|---|---|
| IE | W | SETTING THIS BIT ENABLES INTERRUPTS FROM THE ADAPTER |
| RST | W | SETTING THIS BIT RESETS THE ADAPTER. THIS BIT IS SELF CLEARING. |

*FIG. 10*

| COMMAND/STATUS REGISTER | | | | | | | | ADDRESS: 6 (READ) |
|---|---|---|---|---|---|---|---|---|
| BIT | 7 | 6 | 5 | 4 | 3 | 2 | 1 | 0 |
| DEFINITION | | | | | BC | COL | CRS | IP |

| FIELD | TYPE | DESCRIPTION |
|---|---|---|
| IP | R/O | INTERRUPT PENDING BIT (RESET ON A READ). |
| CRS | R/O | REAL-TIME CARRIER SENSE FROM THE PHY |
| COL | R/O | REAL-TIME COLLISION STATUS FROM THE PHY |
| BC | R/O | REAL-TIME DATA VALID FROM THE PHY |

*FIG. 11*

| MII REGISTER | | | | | | | ADDRESS: 7 | |
|---|---|---|---|---|---|---|---|---|
| BIT | 7 | 6 | 5 | 4 | 3 | 2 | 1 | 0 |
| DEFINITION | | | | | | MW | MC | MD |

| FIELD | TYPE | DESCRIPTION |
|---|---|---|
| MD | R/W | THIS BIT IS USED TO READ/WRITE DATA TO/FROM THE PHY MII. A RLAD OPERATION RETURNS THE CURRENT VALUE OF THE MDIO PIN ON THE PHY. THE MW BIT IS SET TO DRIVE THE MDIO PIN DURING A WRITE OPERATION. |
| MC | W | THIS BIT DRIVES THE MDCK PIN TO THE PHY, WHICH IS USED TO READ/WRITE TO/FROM THE PHY MII |
| MW | R/W | THIS BIT DETERMINES WHETHER THE MD BIT IS AN INPUT OR AN OUTPUT. SETTING THIS BIT WILL DRIVE THE VALUE OF THE MD BIT ON THE MDIO PIN TO THE PHY. THIS BIT SHOULD ONLY BE SET WHEN WRITING TO THE PHY MII. |

*FIG. 12*

REDUCED HARDWARE NETWORK ADAPTER AND COMMUNICATION

BACKGROUND OF THE INVENTION

1. Field of the Invention

The present invention relates to adapters, interfaces and connections between a computer and a network. As a specific example, the present invention is described in terms of an adapter and a communication method between a computer and a computer network that functions in accordance with an industry standard protocol such as IEEE 802.3 or one of its extensions.

2. Description of the Related Art

The present invention generally relates to an adapter for use in connecting a computer, referred to here as a client computer, to a network. The invention will be described and explained with reference to a particular implementation designed for one of the most common network configurations presently in use, commonly known as an Ethernet™ network. This type of network more generally includes those networks that implement the IEEE 802.3 standard, or one of the variations, modifications or improvements on that standard. For simplicity, all of these networks are referenced together as an IEEE 802.3 network, although that designation is not necessarily precise. The networks referenced here provide a framework for understanding the present invention, as do the adapters or network interface controllers that have been developed for those networks.

Client computers of a local area network are often connected together over a common physical link such as coaxial cable, unshielded twisted pairs of wires or shielded twisted pairs of wires. Information is transmitted by client computers onto the physical link in units of frames having one of a number of protocol-defined data structures and a quantity of data ranging from that of a minimum frame length and that of a maximum frame length. The IEEE 802.3 protocol in its simplest form allows only one client computer to transmit information over any distinct physical link at one time. If two client computers provide data to the physical link at the same time, or sufficiently close in time as to create interference between two message signals, the data are corrupted and must be discarded. Such an event is referred to as a collision and must be detected by the client computers. IEEE 802.3 networks use carrier sense multiple access/collision detection (CSMA/CD) to govern access to the physical link. Before a client computer transmits a message to the physical link, it detects whether a carrier signal is present on the physical link. If a carrier signal is present on the physical link, the client computer waits before transmitting the message until no carrier signal is present and the physical link is available.

Once a client computer determines that the physical link is available, the client computer transmits the message to the physical link and onto the network. The client computer monitors the physical link to detect any collision that might occur while it transmits the message over the physical link. The transmitting computer continues to monitor for collisions after transmission during a subsequent message in progress period of time in which the transmitting computer is waiting for the message to reach its destination. Should the client computer detect a collision, the client computer continues transmitting a signal, sometimes referred to as a jam sequence, until the transmission continues for at least a period of time corresponding to a minimum frame length. The client computer then pauses for a predetermined, random amount of time and attempts to gain access to the physical link to once again transmit the data. Each of the client computers attempting to access the physical link executes a similar backoff algorithm, but with different, randomly assigned waiting times so that a single client computer gains access to the physical link, with others of the waiting computers gaining access to the network successively.

Information is typically organized into frames for transmission over an Ethernet™ or other type of CSMA/CD network. FIG. 1 shows the organization of a frame of data for an Ethernet™ frame and FIG. 2 shows the organization for a frame defined in accordance with the standard IEEE 802.3. Both types of networks use a preamble consisting of an alternating pattern of ones and zeros to inform a receiving station that a frame is coming. The Ethernet™ preamble (FIG. 1) further includes an additional byte that is the equivalent of the start of frame byte field defined in the IEEE 802.3 network. The start of frame byte (SOF in FIG. 2) ends with two consecutive "1" bits and is used to synchronize the frame reception of the station connected to the physical link.

The framing of information for these networks includes both the destination address and the source address for the message. The destination address may be a single target computer (unicast), a group of computers (multicast) or all computers on the network (broadcast). The source address is the particular transmitting computer. Ethernet™ frames include a type field identifying the protocol of an upper layer application to receive the message. This field is not present in frames for the IEEE 802.3 network and is replaced by a length field that specifies the number of bytes of data in the message. Both frame structures provide a data field of arbitrary length within a range of possible lengths, followed by a frame check sequence (FCS), which is a four-byte cyclic redundancy check (CRC) value. The FCS is created by the sending computer and is recalculated by the receiving device to check for damaged frames.

Client computers communicating frames of data over a CSMA/CD network use a network interface controller to perform carrier sense, collision detection, and other aspects of data transmission and receive control. Control of data transmission includes generating the frame format and calculating the FCS byte. Data receive control includes the detection of a frame, examining the destination address to determine if the message is intended for that computer, and performing a CRC or other frame check procedure to determine if the frame is valid. Other forms of analysis may be performed on the frame or may have to be performed when there is an error in the frame of data or in the receive operation. For example, information may have to be retransmitted if an error is detected during transmission. All of this processing is conventionally known and performed in typical adapters or controllers that link client computers to a local area CSMA/CD network.

The network interface controller is implemented as an integrated circuit, such as an application specific integrated circuit (ASIC). An example of one configuration of Ethernet controller in an ASIC, described in U.S. Pat. No. 5,872,920, is illustrated schematically in FIG. 3. The network controller ASIC 10 interfaces with a bus 20 of a host computer system and with the twisted pairs or coaxial cable that are part of the physical link 30 of the network. Information is transmitted to and received from the physical interface by a transceiver 40 or through an attachment unit interface 42. Information to be transmitted over the physical link 30 is encoded by encoder 44 and decoder 46 decodes information received from the physical link. Typically, Manchester encoding and decoding are used for IEEE 802.3 networks.

A controller 50, which may be a microcontroller or other type of processor, is typically provided as a core within the ASIC 10 to control the transmit and receive operations using appropriate transmit control 52 and receive control 54 programs or state machines. These programs handle the various data control operations required for transmitting and receiving data from a CSMA/CD network including, for example, handling error conditions for a collision on the physical medium and retransmitting corrupted data as necessary. Most all of the functionality desired to implement applicable standards, such as IEEE 802.3, is implemented within the controller 50. Data coming in and out of the controller 50 are buffered by a transmit FIFO 56 and a receive FIFO 58. Communications with the host computer, including the provision of data to the bus 20 of the host computer, are managed by the host interface 60. Provisions are made to update the host interface 60 by rewriting or updating a data set or program stored within the EEPROM 62. Further details of these circuits and the functionality they implement are described in U.S. Pat. No. 5,872,920, which is hereby incorporated by reference.

It should be appreciated that, while the network interface controller of FIG. 3 is implemented as a single ASIC other configurations are also common. For example, because the physical implementations for a particular network (including driving magnetics, digital to analog circuitry and analog to digital circuitry) can vary greatly, it is often desirable to provide the encoder, decoder, transceiver and other aspects of the interface to the physical link in a dedicated chip. This architecture may be implemented as a distinct PHY chip, allowing a greater level of flexibility that is often more cost-effective than a more integrated, single-chip network interface controller solution. In implementations that provide a distinct PHY chip, it is typical to provide other aspects of the network controller on a second chip, a media access controller (MAC) chip. The MAC of the network controller shown in FIG. 3 includes the controller or processor 50 with its programs, the buffering memory and, in most cases, the host-interface 60.

Considerable effort has been made to increase the functionality provided within integrated circuit network interface controllers such as the ASIC 10 illustrated in FIG. 3. For example, additional functionality and flexibility has been built into network interface controller chips to accommodate improvements or modifications in network communications standards. Particular attention has been paid to higher speed variations of the basic IEEE 802.3 technology.

SUMMARY OF THE PREFERRED EMBODIMENTS

Preferred embodiments of the present invention provide a simplified controller that is better adapted to a low-cost, network-compatible computer. By providing a relatively simple interface structure and by implementing more of the network interface control functionality within a processor on the host computer, such preferred embodiments of the invention provide a low cost, highly flexible solution for a network interface.

An aspect of the present invention provides a computer communications system having a transmit buffer coupled to at least one transmit data line. The transmit buffer receives data from a host computer and temporarily stores the data before transmitting the data over the transmit data line to a physical link of a data network. A receive buffer is coupled to at least one receive data line, the receive buffer adapted to receive data from a physical link of a data network over the receive data line and temporarily store the data before providing the data to a computer. An array of communication registers is also provided. The array includes a data register coupled to the receive buffer, wherein repeated reads from the data register causes data to be read from the receive buffer. The array further includes a status register for storing data identifying a collision of data on the physical link of the network, where the status register is readable from the host computer. The status register also includes at least one bit signifying an interrupt state in at least one of a read and a write operation.

Another aspect of the invention provides a computer communications system comprising a media access controller including a receive buffer coupled to receive data from a data network and temporarily store the data before providing the data to a host computer. The media access controller has communication registers including a data register coupled to the receive buffer, wherein repeated reads from the data register reads data from the receive buffer. The communication registers provide a status register storing at least one interrupt bit. The interrupt bit is set to indicate the presence of data received from the data network and destined for the host computer and the interrupt bit is readable by the host computer to indicate the presence of data to be read.

Still another aspect of the invention provides a computer communications system comprising a media access controller including a plurality of communication registers. The communication registers preferably include a data register coupled to the receive buffer, wherein repeated reads from the data register read data received from the data network. A status register stores at least one interrupt bit, the interrupt bit set to indicate the presence of data received from the data network and destined for the host computer, the interrupt bit readable by the host computer. A media independent interface register stores at least one signal for controlling operation of PHY circuitry coupled to the media access controller, wherein signals from the host computer are passed from the media independent interface register to control PHY circuitry as data are read from the data network. A byte-count register stores a value indicative of the number of bytes stored in the media access controller for transfer to the host computer, where the byte count register is decremented as data are read from the media access controller.

BRIEF DESCRIPTION OF THE DRAWINGS

These and other aspects of the present invention are better understood by reference to the following description that references and includes the following figures.

FIG. 8 illustrates the structure and functions of the Ethernet data register of the FIG. 7 register set.

FIG. 9 illustrates the structure and functions of the byte count register of the FIG. 7 register set.

FIG. 10 illustrates the structure and functions of the command/status register of the FIG. 7 register set for write operations.

FIG. 11 illustrates the structure and functions of the command/status register of the FIG. 7 register set for read operations.

FIG. 12 illustrates the structure and functions of the MII (media independent interface) register of the FIG. 7 register set.

DETAILED DESCRIPTION OF THE PREFERRED EMBODIMENTS

Figure 1:
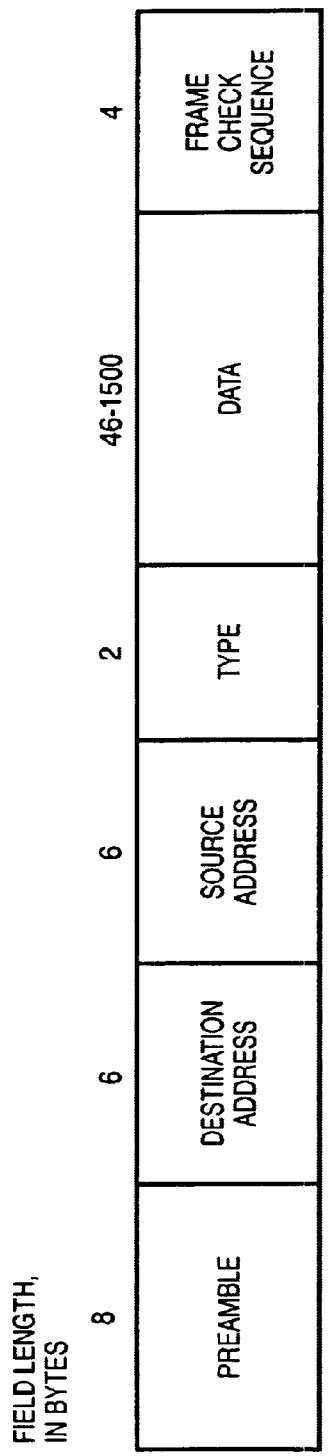
FIG. 1 illustrates a frame structure for an Ethernet network.
Figure 2:
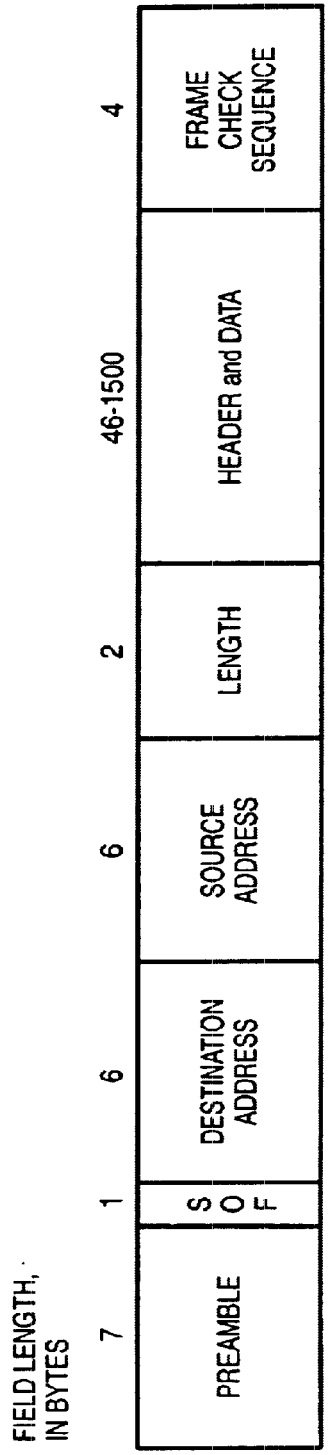
FIG. 2 illustrates a frame structure for a network in accordance with the IEEE 802.3 standard.

Communication between a computer and a network is conventionally conducted through a network interface controller (NIC) or adapter. Preferred embodiments of the present invention provide a reduced hardware implementation of a network interface controller. Implementations of preferred aspects of an adapter in accordance with the invention may provide computers with network interface connections that are lower in cost and consume less power than conventional controllers. Aspects of the present invention make it possible to implement adapters in a manner that is far easier to modify to accommodate changes in technology or to provide solutions for unusual or specialized applications.

Particularly preferred embodiments of the present invention provide a reduced hardware MAC with a significant portion of the MAC functionality implemented as software within the host client computer. Most preferably, the MAC functionality embodied within the client computer is implemented as software within a processor of the client computer and most preferably the MAC functionality is implemented within the main processor of a personal computer type of architecture. The hardware portion of the preferred MAC implementation provides memory for buffering communications between the PHY and the client computer. The preferred hardware aspects of a MAC in accordance with the present invention also includes a register interface for register-driven communications between the hardware portion of the MAC and the software portions of the MAC implemented within the client computer. By implementing most of the MAC functionality in software within the host computer, the preferred MAC provides lower cost, lower power consumption, and generally greater flexibility.

Aspects of the present invention can provide an interface between a client or other computer and a network such as a local area network functioning in accordance with any of the defined IEEE 802.3 protocols. Other related aspects of the present invention provide a method of communicating information to, from or between a computer and one or more other computers through an IEEE 802.3 network. The term IEEE 802.3 is used broadly here to generally encompass CSMA/CD networks including presently planned variations including gigabit Ethernet™ and other variations that might be developed later. Aspects of the invention are believed to have advantages in interfacing to and communicating with other types of networks using other types of protocols. Many of the examples and explanations provided here are set forth in terms of communicating with an IEEE 802.3 network, both because of the familiarity of these networks and because of the present prominence of IEEE 802.3 and Ethernet™ networks. The specific applications used to illustrate the invention are not, however, intended to limit the scope of the invention.

Similarly, illustrations of the present invention are made within the framework of presently available and used IEEE 802.3 protocols. More advanced implementations of IEEE 802.3 and successors to IEEE 802.3 will be developed and brought to market in the future. Many aspects of the present invention are expected to have advantages when applied to such networks, as well.

Figure 3:
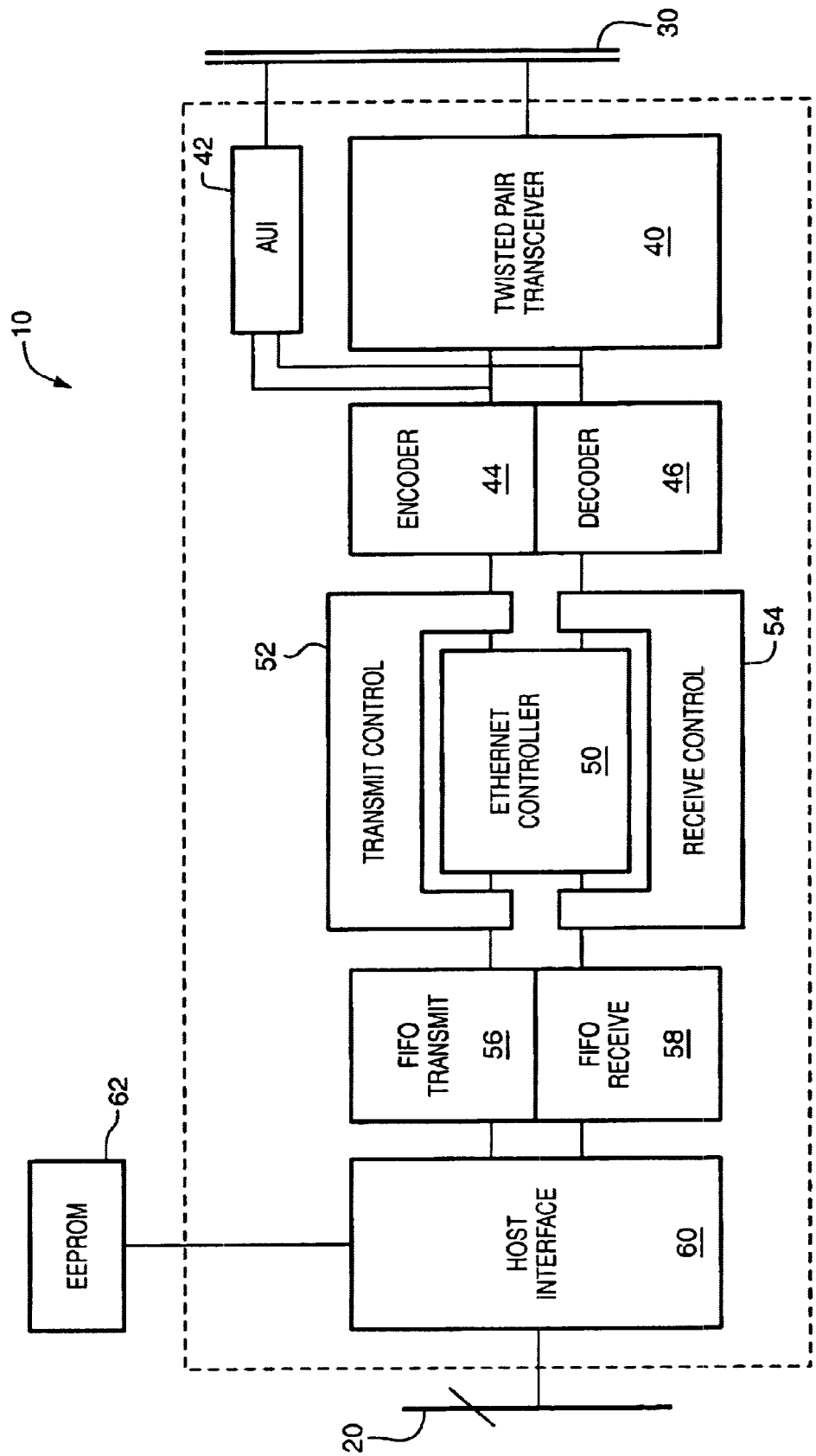
FIG. 3 illustrates a network interface control chip that provides a high level of functionality on the chip.
Figure 4:
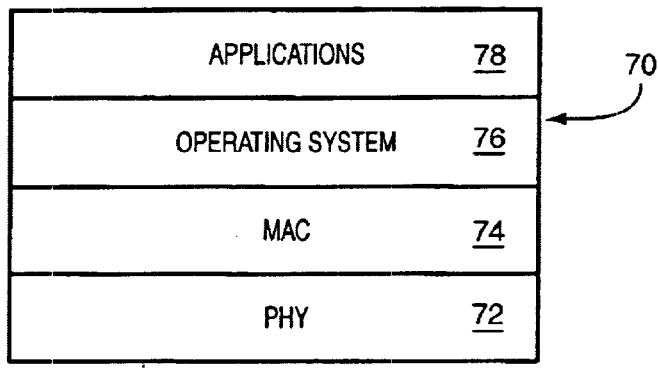
FIG. 4 illustrates an architectural overview of an aspect of the present invention.

FIG. 4 illustrates, from a schematic architectural point of view, aspects of a client computer 70 that are involved in communicating information to and from a network. The data network includes a physical link such as wire pairs or coaxial cabling that carries the actual data signals to and from the client computer. The client computer 70 connects to this physical link through the physical layer of the network model indicated as PHY 72 in FIG. 4. The PHY might include the magnetic circuitry for placing signals onto and deriving signals from the physical link. PHY 72 also includes appropriate support circuitry such as analog to digital converters, digital to analog converters, and phase lock loop detection circuitry for recovering signals from the physical link according to a received or derived clock signal. Generally, the PHY 72 also includes encoding and decoding circuitry such as that illustrated in FIG. 3.

The PHY 72 is generally adapted to a particular network protocol or definition. As such, aspects of the PHY 72 may vary significantly, but in a well-known and understood manner, between different applications of the architecture of FIG. 4. PHY 72 is commercially available in a number of forms in different network environments, whether as a distinct chip or as a core to be provided within an ASIC.

The next higher level of the network model illustrated in FIG. 4 is the media access control or MAC 74. The MAC 74 may embody a range of functionality, but generally serves the purpose of initially analyzing and formatting the stream of data bits provided by PHY 72 so that the data are in a form immediately usable by the upper levels of the network model. MAC 74 interfaces with the operating system 76 of the client computer 70 for the storage of data received from the network. MAC 74 is generally responsive to application programs 78 within the client computer that communicate through the operating system 76 to generate messages for transmittal or requests for information.

MAC functionality may include a number of different aspects of communications. For example, data from the network might be provided by PHY 72 in 4-bit parallel format. The MAC preferably reformats that 4-bit parallel data into bytes or words appropriate for the client computer, for example, 8-bit bytes or 32-bit words. Other aspects of communication that might be included in the MAC are address recognition, frame recognition, frame analysis, and detection of and management of collisions or other forms of network errors. As discussed in the background and illustrated in FIG. 3, conventional implementations of MAC 74 include a variety of functions on a single integrated circuit. Such conventional implementations of a MAC provide a processor or other form of logic capable of executing a state machine or program that performs these functions.

Preferred implementations of the present invention provide a simplified MAC, at least from a circuitry point of view. In most implementations, embodiments of the present invention will include a simplified hardware MAC and a complementary software MAC preferably within a host processor that will, in combination, provide much if not more of the functionality performed by the MAC illustrated in FIG. 3. Of course, implementations of a MAC in accordance with an embodiment of the present invention might provide less of the MAC functionality and still practice aspects of the present invention. In contrast to the MAC of FIG. 3, a MAC in accordance with preferred aspects of the present invention provides a minimal set of circuitry and implements most aspects of MAC functionality within a processor on the client computer 70. In a present implementation, a MAC in accordance with the invention might include buffering memory and a communication register set with other aspects of MAC functionality implemented as software to be executed by the microprocessor of a personal computer or similar type of client computer.

Figure 5:
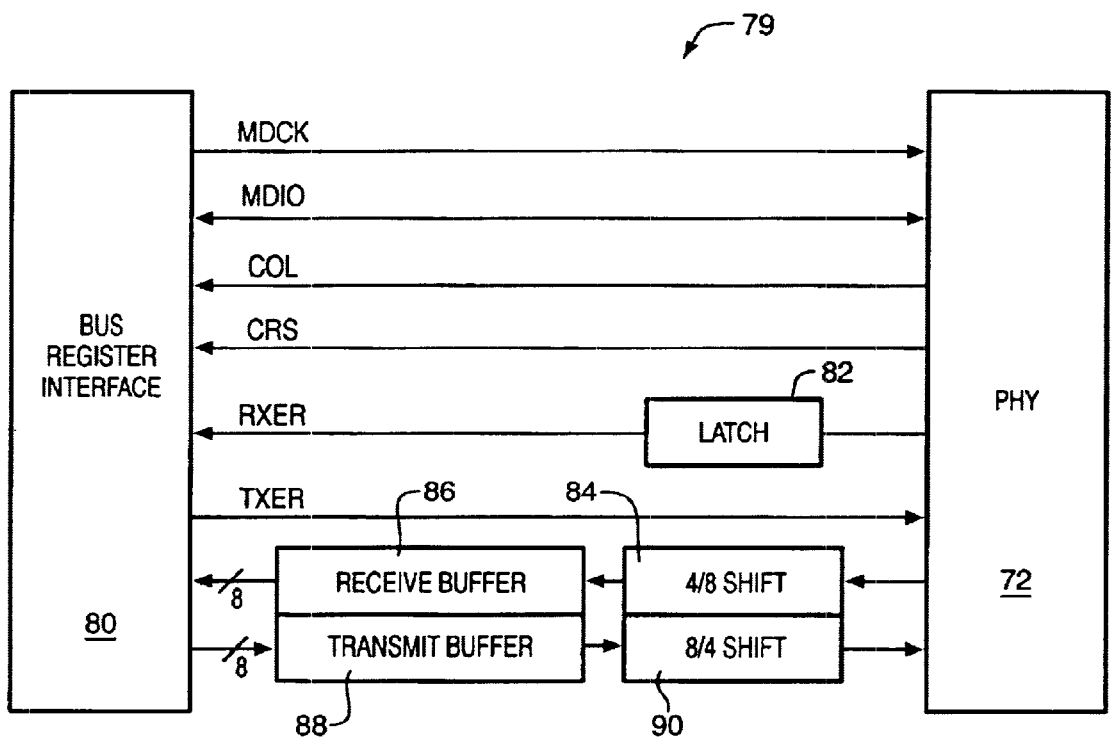
FIG. 5 illustrates a particularly preferred implementation of a network controller in accordance with the present invention.

FIG. 5 illustrates particularly preferred hardware aspects of a network interface adapter 79 in accordance with the present invention. As illustrated, the adapter includes a PHY 72 appropriate to the target network physical link and a reduced hardware MAC. The reduced hardware MAC includes memory for buffering data as it is transferred to or received from the PHY 72 including, preferably, a latch for storing a receive error signal that may occur only for a period of the total time required to receive a frame of data. The remaining hardware aspects of the illustrated and particularly preferred MAC is a set of registers for handling the communication of instructions, status and error information and for facilitating data transfer between the adapter and the client computer. Thus, the illustrated bus register interface 80 preferably includes a complete but relatively minimal set of communication and data registers so that most of the communication functions are performed within the client computer and preferably in the processor of the client computer.

Still referring to FIG. 5, the top two lines are signals for communicating with the media independent interface (MII) within PHY 72. The signal line MDCK provides a data clock signal from the interface 80 to the PHY 72 and is used for both reading and writing data to the MII of PHY 72. MDIO is a serial data line for MII communications between the bus register interface 80 and the PHY 72. The type of instructions and other information provided over the MDIO line are in accordance with the requirements of the media independent interface, which is a known protocol and standardized within the industry.

The next two lines illustrated in FIG. 5 communicate network conditions from the PHY 72 to the bus register interface 80. The line COL is a signal transmitted when a collision is detected on the physical link during the transmission of data from the PHY 72 onto the physical link. The line CRS carries a signal identifying the presence of a carrier signal (carrier sense) on the physical link while a message is being received. Signals on either of the COL and CRS lines are stored within a command/status register within the interface 80 so that the host client computer can detect the error conditions and perform the appropriate error handling functions.

The next line illustrated in FIG. 5 represents information provided by the PHY 72 to the bus register interface indicative of the validity of data received from the physical link. The line RXER carries a signal indicative of an error during the reception of data. The signal provided over line RXER might be a relatively short-lived signal at least as compared to the amount of time taken to transmit a frame of data. Consequently, it is preferred that a latch 82 be provided along this line so that an error signal generated by the PHY 72 is held within the latch to ensure it is available for storage in the bus register interface 80 after transmission of the frame of data is complete. The line TXER performs a similar function for the transmission of data to the physical link. The interface 80 causes a signal to be provided over line TXER when an error is known to have occurred in the transmission of data to the PHY 72 and the physical link beyond. For example, the line TXER may be used to indicate that an underflow error has occurred for the transmit buffer 88 of the MAC.

In the illustrated embodiment, the bus register interface 80 stores data in units of 8-bit bytes. Data provided to and from the PHY 72 are organized as four parallel bits. It is consequently desirable to reformat the 4-bit data from the PHY into 8-bit data within an appropriately configured register 84. Register 84 is shown as a 4–8 bit parallel shift register. The output from register 84 is provided to a receive buffer 86, which buffers data received from the physical link before it is read out into the client computer through the bus register interface 80. Data from the client computer are provided in 8-bit bytes to a transmit buffer 88 that buffers the data before providing it to register 90, which formats the 8-bit data into successive 4-bit data items and provides the data items to the PHY 72.

The receive buffer 86 and transmit buffer 88 are preferably FIFOs (first in, first out memories) of a size appropriate to accommodate latency within the client computer. Because servicing of the adapter illustrated in FIG. 5 is but one of the tasks to be performed by the preferred microprocessor of the client computer there may be occasions where the processor is not ready to handle the data being transmitted to or received from the physical link. It is consequently desirable that the receive and transmit FIFOs be of sufficient size to accommodate typical latency delays. In practice, it is believed that an appropriate buffer size is approximately the size of one packet or on the order of about two thousand bytes. The appropriate size of the buffer can be chosen according to the design of the system. Since the rate at which data either will be received or needs to be transmitted will depend on the particular network being serviced by the adapter, the size of the buffer may vary significantly in different applications.

Figures 6, 7:
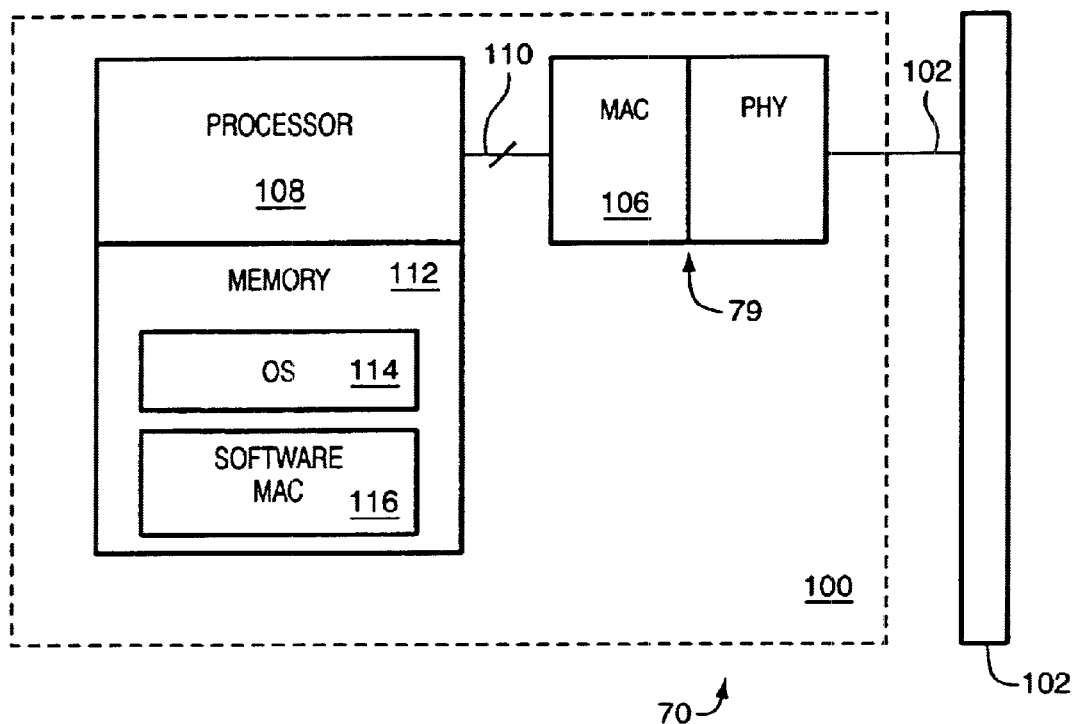
FIG. 6 illustrates the network interface controller of FIG. 5 coupling a client computer to a network.
FIG. 7 shows the addresses and functions for registers within a preferred register set provided within the controller of FIG. 5.

FIG. 6 illustrates an installation of the adapter 79 to couple a client computer 100 to a network 102 through a set of twisted wire pairs 104. The illustrated adapter 79 preferably has the structure illustrated in FIG. 5 and, in particular, provides a reduced hardware MAC 106 including the buffer memory and bus register interface 80 shown in FIG. 5. The reduced hardware MAC 106 is preferably coupled to the main processor 108 of the client computer 100 through a bus 110. The bus 110 is preferably a thirty-two bit or larger bus operating at a sufficient speed to move data in and out of the MAC 106 at a desired speed to minimize latency. An appropriate bus speed is facilitated by coupling the MAC 106 to an appropriate bus, such as a PCI bus or, in a particularly preferred embodiment, a PC Bus, Card Bus or other bus appropriate to coupling a PCMCIA card to a computer such as a notebook or other portable computer. Typical implementations of these buses are sufficiently fast as to allow the implementation of significant portions of the MAC functionality as software running on the processor 108. The reduced size and reduced power consumption of preferred implementations of the adapter 79 are particularly desirable for a portable computer implementation of the present invention.

At least portions of the client computer's operating system 114 and portions of the software aspects 116 of the MAC are expected to be available in memory 112 as information is transmitted to and received from the physical link of the network 102. The illustrated memory 112 may be partially within the processor 108 and partially within an array of DRAM or other, less volatile memory including, for example, on a disk drive or in flash or other solid state memory. In other implementations, the illustrated memory 112 might be entirely inside or outside of the processor 108. Regardless of the particular memory implementation, the software aspects of the MAC 116 preferably communicate through the operating system 114 within the processor 108 to the hardware aspects of the MAC by addressing the communication registers 80 within the MAC 106.

The communication registers within the bus register interface 80 are addressed using a preferred register address scheme. In the embodiment illustrated in part in FIG. 7, a three-bit address signal can be used to address a minimal register implementation including a total of eight registers. As shown, four data registers are provided in the four lowest addresses, with the next two registers and addresses preferably dedicated to byte count registers storing the number of bytes available to be read from the receive FIFO 86. The data registers are illustrated in greater detail in FIG. 8. Repeated reads from the data registers will read data out of the receive FIFO 86 and repeated writes to the data registers will fill the transmit FIFO 88 with data to be sent to the network 102. The byte-count register is illustrated in greater detail in FIG. 9. These byte-count registers are used in read operations to indicate whether and how much data remain to be received from the network 102. As data are written into receive buffer, the value stored in the byte-count register is incremented and, as data are read from the receive buffer 86, the value stored in the byte-count register is decremented.

It should be noted that the data received from the network might include erroneous data or might include proper frame data. As such, it is generally undesirable to rely on the transferred data itself to indicate whether additional data remains to be received from the network.

FIGS. 10 and 11 illustrate the command/status register for write and read operations, respectively, both of which have the same address but different definitions for the write and read operations. Bit 0 is defined for enabling interrupts from the adapter to the operating system of the client computer during write operations. Bit 7 of the command/status register is set by the client computer to reset the adapter. This bit clears automatically with the reset of the adapter.

When the MAC software 116 is reading the adapter, the command/status register (FIG. 11) uses bit 0 as an interrupt pending bit to notify the host client computer of an interrupt pending to be read. The MAC software 116 reads the command/status register to determine what action is required by the interrupt, whether there is data to be read (BC) or if there is an error (COL, CRS) to be handled. Once the interrupt bit is read, it is reset. The remaining bits 1–3 provides carrier sense, collision sense and receive data valid signals from the PHY. When the byte count bit BC is not zero, the MAC software begins reading the data registers to read data out of the receive buffer 86. When either of the COL or CRS bits is valid, the MAC software 116 is called on to handle the error condition, either by performing a backoff algorithm (COL) or by discarding the received, erroneous data (CRS) by flushing the receive buffer of the erroneous data.

FIG. 12 shows definitions of bits within the MII register, which occupies the final position within the preferred bus register interface 80. The MII or a reduced media independent interface (RMII) is used by the MAC software 116 to control and monitor the operation of the PHY. Communications of MII information is conducted serially through the MD bit of the MII register, through the MDIO line (FIG. 5) and through the MDIO pin of the PHY.

The MAC software 116 controls much of the operation of the adapter 79. Generally, the MAC software can be viewed as including a lower level piece that handles interrupts and data transfer and an upper level piece that performs more sophisticated, but less immediate operations. Receive operations are interrupt driven and the interrupts are handled by the lower level facility of the MAC software 116. When the operating system 114 receives an interrupt from the adapter 79, the operating system calls the lower level facility of the MAC software.

The lower level facility reads the command/status register to clear the interrupt pending bit. If there are data present, the lower level facility begins a loop to first check the byte count in the byte count register (FIG. 9). If the byte count is zero, the lower level facility exits the loop and returns to a standby state and if the byte count is non-zero, then the data are read from the data register (FIG. 8). The loop continues until the byte count reaches zero and then lower level facility exits the loop and returns to a standby state until another interrupt is detected.

The data read out by the lower level facility is stored in a buffer within the processor or in DRAM. Further processing is necessary in accordance with the frame definition and other processing relevant to the IEEE 802.3 or other protocol by which the network is organized and communications proceed. For example, processing of the data packet for an IEEE 802.3 network might include the processor 108 detecting a frame preamble, checking the frame length to determine if the frame is of a valid length. The processor evaluates the frame using the FCS data to evaluate whether the frame is valid. For example, if the FCS data is CRC data, then a polynomial division is performed on the data using the protocol defined check polynomial to determine if the data are valid. All of these functions are performed by an upper level facility of the MAC software 116. The MAC software also may perform filtering to detect whether the address of the packet is relevant to the host client computer.

The MAC software further tracks the network statistics in accordance with network protocols. Statistics include the number of frames successfully transmitted and the frequencies with which erroneous frames are transmitted. These statistics are made available to network management software, such as software in accordance with a simple network management protocol.

The operation of writing data to the network is also a cooperation between the MAC software 116 and the adapter 79. Data to be provided to the network is formatted by the upper level facility of the MAC software into appropriate frames and the upper level facility calculates the FCS data, such as appropriate cyclic redundancy check (CRC) data, and appends the FCS data to the frame. The frames of data are passed to the lower level facility of the MAC software, which writes the data to the data register and thus to the transmit FIFO 88 of the adapter. The low-level portion of the MAC software 116 monitors the adapter to ensure that data are transferred safely from the buffer FIFO 88 to the network. For example, the low-level facility checks the FIFO to see if the FIFO is full and cannot receive additional data or if the FIFO has been completely emptied (an underflow condition). The low-level facility further monitors the COL bit of the command/status register to determine if there has been a collision.

The upper levels of the MAC software 116 perform the well-known functions of an Ethernet™ or IEEE 802.3 network. These functions are conventionally implemented as software or state machines within the processor of a conventional network interface controller. As such, it is well within the ordinary skill in this art to implement these functions in the microprocessor or other processor of the host client computer. These aspects of the invention will therefore not be further described here.

Installation of an adapter in accordance with the present invention would proceed by installing the reduced hardware MAC, for example within a PCMCIA card that also includes PHY circuitry appropriate to the target network. Driver software is installed to the host computer in a manner that the MAC software is available to be accessed by the operating system of the host computer.

Certain variations of the design discussed here will be apparent to those of ordinary skill in the art. For example, the reduced hardware MAC illustrated in FIG. 5 is readily implemented as a core to be implemented in an ASIC or within the PHY. It is possible that the reduced hardware MAC could be implemented as a distinct core within a system on a chip, with the software aspects of the MAC implemented within the system on a chip's processor. Preferred aspects of the present invention provide a flexible architecture for a network interface adapter. As such, the inventors expect that adapters in accordance with the present invention will find application in a variety of yet to be completed network protocols. Moreover, the bus register interface might include different combinations of registers to effect the reduced hardware MAC of the present invention.

Those of ordinary skill in the art will appreciate that a number of variations and modifications might be made to the particular embodiments described herein without varying from the basic teachings of the present invention. As such, the scope of the present invention is not to be limited to the particular embodiments described herein. Rather, the scope of the invention is to be determined from the claims, which follow.

What is claimed:

1. A network interface adapter, comprising:
a physical layer circuitry coupled with a physical link of a data network; and
a reduced hardware media access control (MAC) in communication with the physical layer circuitry, the MAC having
a transmit buffer to receive data from a client computer and temporarily store the data before transmitting the data to the physical link,
a receive buffer to receive data from the physical link and temporarily store the data before providing the data to the client computer, and
a register interface coupled to the transmit and receive buffers, the register interface having data registers including a status register having at least one interrupt bit signifying an interrupt state in at least one of a read and write option.

2. The network interface adapter of claim 1, wherein the physical layer circuitry comprises the MAC.

3. The network interface adapter of claim 1, wherein the MAC further comprises at least one signal line for communicating with a media independent interface (MII) of the physical layer circuitry.

4. The network interface adapter of claim 1, wherein the MAC further comprises at least one network condition line for communicating network conditions from the physical layer circuitry to the register interface.

5. The network interface adapter of claim 1, wherein the MAC further comprises at least one validity line for communicating validity of data received from the physical link.

6. The network interface adapter of claim 1, wherein the transmit buffer and the receive buffer each comprise a first-in-first-out (FIFO) buffer.

7. A system, comprising:
a network interface adapter to couple a client computer with a network, the network interface adapter having
a physical layer circuitry coupled with a physical link of the network, and
a reduced hardware media access control (MAC) in communication with the physical layer circuitry, the MAC having
a transmit buffer to receive data from the client computer and temporarily store the data before transmitting the data to the physical link,
a receive buffer to receive data from the physical link and temporarily store the data before providing the data to the client computer, and
a register interface coupled with the transmit and receive buffers, the register interface having a status register including at least one bit signifying an interrupt state in at least one of a read and write operation.

8. The system of claim 7, wherein the physical layer circuitry and the MAC each comprise a distinct chip.

9. The system of claim 7, wherein the MAC further comprises at least one signal line for communicating with a media independent interface (MII) of the physical layer circuitry.

10. The system of claim 7, wherein the MAC further comprises at least one network condition line for communicating network conditions from the physical layer circuitry to the register interface.

11. The system of claim 7, wherein the MAC further comprises at least one validity line for communicating validity of data received from the physical link.

12. A system, comprising:
a transmit buffer coupled with at least one transmit data line, the transmit buffer adapted to receive data from a host computer and temporarily store the data before transmitting the data over the transmit data line to a physical link of a data network;
a receive buffer coupled with at least one receive data line, the receive buffer adapted to receive data from a physical link of a data network over the receive data line and temporarily store the data before providing the data to a computer; and
an array of communication registers, the array including a data register coupled with the receive buffer, wherein repeated reads from the data register causes data to be read from the receive buffer,
the array further including a status register for storing data identifying a collision of data on a physical link of the data network, the status register readable from the host computer, the status register also including at least one bit signifying an interrupt state in at least one of a read and write operation.

13. The system of claim 12, further comprising a latch coupled between the array and connections to the data network, the latch storing an error signal identifying an error in receiving a frame of data, the latch retaining the error signal for a period of time sufficient to receive the frame of data.

14. The system of claim 12, wherein repeated writes to the data register stores data within the transmit buffer.

15. The system of claim 12, wherein the transmit buffer is coupled with the data network through PHY circuitry.

16. The system of claim 15, wherein the array further comprises a media independent interface register storing at least one signal for controlling operation of the PHY circuitry, wherein signals are passed from the media independent interface register to control the PHY during read and write accesses to the data network.

17. The system of claim 12, wherein the array of communication registers are readable by network communication software executed by a processor of a host computer, wherein data read from the data network is received in frames and wherein the processor analyzes a frame of received data in accordance with frame check data stored within the received frame of data.

18. A system, comprising
a media access controller (MAC) having a receive buffer coupled to receive data from a data network and temporarily store the data before providing the data to a host computer,
the media access controller further having communication registers, the communication registers having a data register coupled to the receive buffer, wherein repeated reads from the data register read data from the receive buffer, and
the communication registers further having a status register adapted to store at least one interrupt bit, the interrupt bit set indicate the presence of data received from the data network and destined for the host computer, the interrupt bit readable by the host computer to indicate the presence of data to be read.

19. The system of claim 18, wherein the receive buffer is coupled with the data network through PHY circuitry.

20. The system of claim 19, wherein the communication registers include a media independent interface register storing at least one signal for controlling operation of the PHY circuitry, wherein signals from the host computer are passed from the media independent interface register to control the PHY as data are read form the data network.

21. The system of claim 18, wherein the communication registers include a byte-count register storing a value indicative of the number of bytes stored in the receive buffer, the byte count register being decremented as data are read from the receive buffer.

22. The system of claim 21, wherein software resident on the host computer performs a sequence of steps including checking a value stored in the byte-count register and, if the byte-count register stores a non-zero value, reading data from the data register.

23. The system of claim 19, wherein a data transfer through the PHY circuitry sets the interrupt bit and wherein the interrupt bit is read out to the host computer over a data bus of at least one byte of data in width.

24. The system of claim 18, further comprising software operable on the host computer for extracting data from a frame format.

25. The system of claim 19, wherein the status register further includes a plurality of bits settable by the PHY circuitry to identify an error on the data network.

26. The system of claim 25, wherein the plurality of bits includes a carrier sense bit indicative of sensing of a carrier signal at an improper time on the data network.

27. The system of claim 26, wherein the carrier sense bit is directly readable by a MAC program executed within a processor of the host computer.

28. A system, comprising
a media access controller including a plurality of communication registers, the communication registers having a data register coupled with the receive buffer, wherein repeated reads from the data register reads data received from the data network,
a status register including at least one interrupt bit, the interrupt bit set to indicate the presence of data received from the data network and destined for the host computer, the interrupt bit readable by the host computer,
a media independent interface register storing at least one signal for controlling operation of PHY circuitry coupled to the media access controller, wherein signals from the host computer are passed from the media independent interface register to control PHY circuitry as data are read from the data network, and
a byte-count register storing a value indicative of the number of bytes stored in the media access controller for transfer to the host computer, the byte-count register decremented as data are read from the media access controller.

29. The system of claim 28, wherein the status register further comprises a plurality of bits settable by the PHY circuitry to identify an error on the data network.

30. The system of claim 29, wherein the plurality of bits comprises a carrier sense bit indicative of sensing of a carrier signal at an improper time on the data network.

31. The system of claim 30, wherein the carrier sense bit comprises a carrier sense bit directly readable by a MAC program executed within a processor of the host computer.

32. An apparatus, comprising:
a network;
a client computer coupled with the network;
a network interface adapter for coupling the client computer with the network, the network interface adapter having
a reduced hardware media access controller (MAC) coupled with the network via a physical interface, the MAC having a memory for buffering communications between the physical interface and the client computer, and
a register interface to handle communications between the network interface adapter and the client computer, the register interface comprises a data register and a status register, the status register having at least one bit signifying an interrupt state in at least one of a read and write operation.

33. The apparatus of claim 32, wherein the communications comprise communications of instructions, status information, or error information between hardware of the MAC and software of the MAC implemented on the client computer.

34. The apparatus of claim 32, wherein the memory for buffering comprises memory for transmit buffering and memory for receive buffering.

35. A system, comprising:
a computer network;
a client computer coupled with the computer network;
a network interface adapter for coupling the client computer with the computer network, the network interface adapter having
a reduced hardware media access controller (MAC) coupled with the computer network via a physical interface, the MAC having a memory for buffering communications between the physical interface and the client computer, and
a register interface to handle communications between the network interface adapter and the client computer, the register interface comprises a data register and a status register, the status register having at least one bit signifying an interrupt state in at least one of a read and write operation.

36. The system of claim 35, wherein the communications comprise communications of instructions, status information, or error information between hardware of the MAC and software of the MAC implemented on the client computer.

37. The system of claim 35, wherein the memory for buffering comprises memory for transmit buffering and memory for receive buffering.

38. A method, comprising:

receiving data by a transmit buffer from a host computer and temporarily store the data before transmitting the data over a transmit data line to a physical link of a data network;

receiving the data by a receive buffer and temporarily storing the data before providing the data to a computer;

causing the data to be read from the receive buffer due to repeated reads from a data register coupled with the receive buffer; and storing data identifying a collision of the data on the physical link of the data network using a status register, wherein the status register having at least one bit signifying an interrupt state in at least one of a read and write operation.

39. The method of claim 38, wherein the transmit buffer is coupled with the data network via a physical circuitry.

40. The method of claim 38, wherein the data register and the status register are included in an array of communication registers.

* * * * *

UNITED STATES PATENT AND TRADEMARK OFFICE
CERTIFICATE OF CORRECTION

PATENT NO. : 6,651,107 B1
DATED : November 18, 2003
INVENTOR(S) : Conley et al.

It is certified that error appears in the above-identified patent and that said Letters Patent is hereby corrected as shown below:

<u>Title page, Item [54] and Column 1, line 2,</u>
Title, after "COMMUNICATION", insert -- METHOD --.

Signed and Sealed this

Thirteenth Day of April, 2004

JON W. DUDAS
*Acting Director of the United States Patent and Trademark Office*